United States Patent
Bali et al.

(10) Patent No.: US 7,451,167 B2
(45) Date of Patent: Nov. 11, 2008

(54) VERIFICATION OF FILE SYSTEM LOG DATA USING PER-ENTRY CHECKSUMS

(75) Inventors: Naveen Bali, Cary, NC (US); Raymond C. Chen, Campbell, CA (US); Kayuri Patel, Cupertino, CA (US); Alexander D. Petruncola, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 473 days.

(21) Appl. No.: 10/692,668

(22) Filed: Oct. 24, 2003

(65) Prior Publication Data

US 2005/0091229 A1   Apr. 28, 2005

(51) Int. Cl.
   *G06F 17/30* (2006.01)
(52) U.S. Cl. .............. 707/202; 707/5; 707/9; 707/102; 709/203
(58) Field of Classification Search .......... 707/202, 707/200, 9, 102; 717/126; 711/117; 709/203, 709/212, 223, 226
   See application file for complete search history.

(56) References Cited

U.S. PATENT DOCUMENTS

| | | | | |
|---|---|---|---|---|
| 5,737,514 A | * | 4/1998 | Stiffler | 714/13 |
| 5,812,751 A | * | 9/1998 | Ekrot et al. | 714/4 |
| 6,055,604 A | * | 4/2000 | Voigt et al. | 711/117 |
| 6,119,244 A | * | 9/2000 | Schoenthal et al. | 709/216 |
| 6,145,089 A | * | 11/2000 | Le et al. | 714/4 |
| 6,199,112 B1 | * | 3/2001 | Wilson | 709/227 |
| 6,353,612 B1 | * | 3/2002 | Zhu et al. | 370/360 |
| 6,449,734 B1 | * | 9/2002 | Shrivastava et al. | 707/8 |
| 6,505,305 B1 | * | 1/2003 | Olarig | 714/5 |
| 6,526,478 B1 | * | 2/2003 | Kirby | 711/114 |
| 6,553,509 B1 | * | 4/2003 | Hanson et al. | 714/5 |
| 6,625,747 B1 | * | 9/2003 | Tawil et al. | 714/6 |
| 6,880,149 B2 | * | 4/2005 | Cronce | 717/126 |
| 6,883,031 B1 | * | 4/2005 | Hurley et al. | 709/227 |
| 2003/0014539 A1 | * | 1/2003 | Reznick | 709/238 |
| 2003/0162541 A1 | * | 8/2003 | Schwarzbauer et al. | 455/432 |
| 2004/0073831 A1 | * | 4/2004 | Yanai et al. | 714/7 |

* cited by examiner

*Primary Examiner*—Shahid A Alam
(74) *Attorney, Agent, or Firm*—Blakely, Sokoloff, Taylor & Zafman LLP

(57) ABSTRACT

A storage server provides a set of client devices with access to a set of mass storage devices. The storage server receives requests from the client devices, each request representing a storage operation to be performed by the storage server on the set of mass storage devices. The storage server maintains a log of write requests received from the client devices, the log including a separate log entry for each of the write requests, and a separate checksum in each of the log entries. Each checksum is for use by a checksum algorithm in determining data integrity of the corresponding log entry. The checksum algorithm is selected, from among a number of selectable a checksum algorithms, based on one or more predetermined criteria, such as a desired balance between performance and checksum strength.

15 Claims, 5 Drawing Sheets

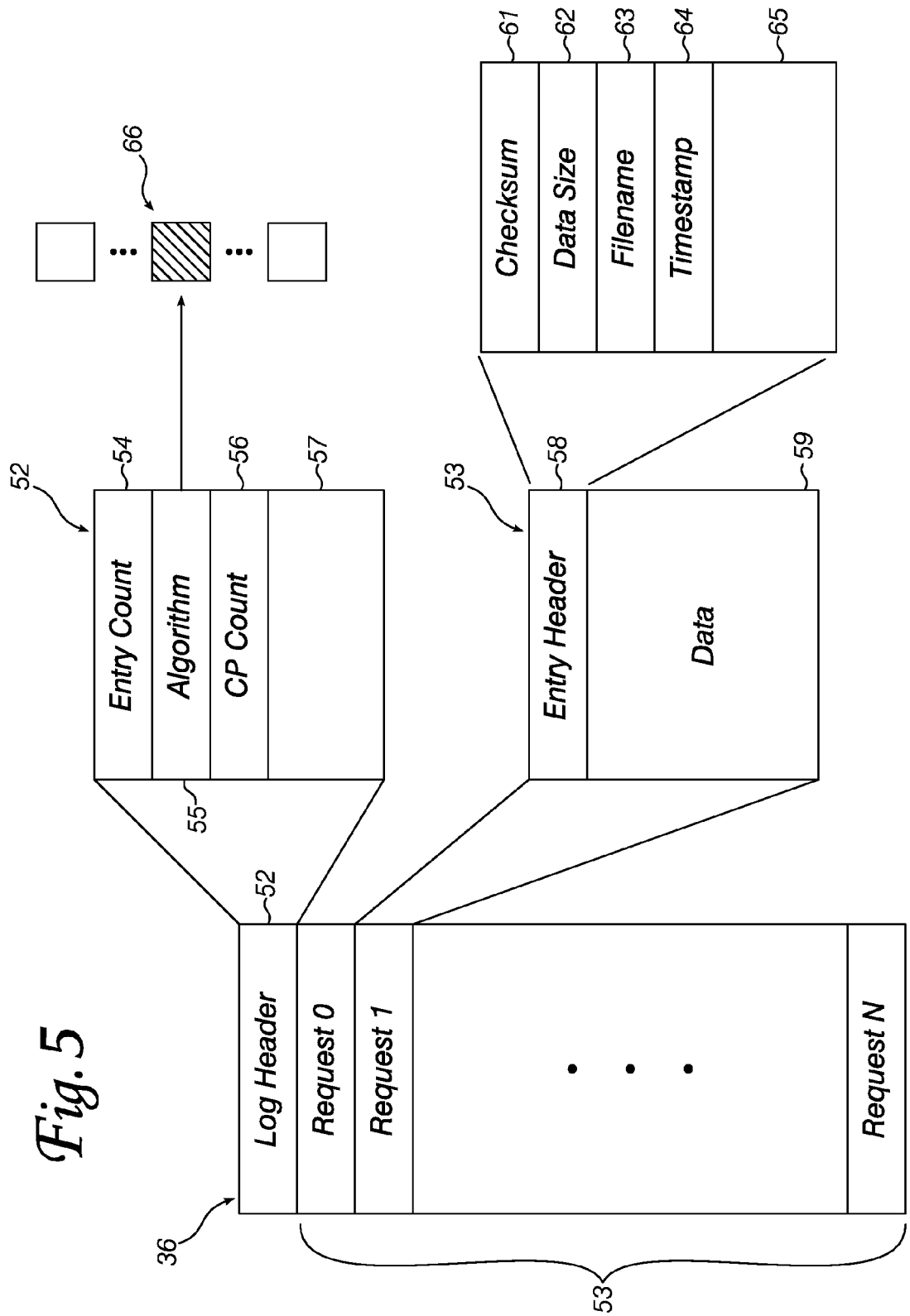

VERIFICATION OF FILE SYSTEM LOG DATA USING PER-ENTRY CHECKSUMS

FIELD OF THE INVENTION

At least one embodiment of the present invention pertains to data storage systems, and more particularly, to techniques for verifying the integrity of log data in a data storage server.

BACKGROUND

A file server is a type of storage server which operates on behalf of one or more clients to store and manage shared files in a set of mass storage devices, such as magnetic or optical storage-based disks. The disks in a file server system are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance that attaches to a network, such as a local area network (LAN) or a corporate intranet. An example of such an appliance is any of the NetApp Filer products made by Network Appliance, Inc. in Sunnyvale, Calif.

A file server implements a file system, which is a software layer that keeps track of the stored data in response to storage operations, i.e., read and write operations. In a large system, it may be impractical to save data modifications to disk every time a write request is received from a client. Therefore, the system may instead save modifications to disk periodically, such as every 10 seconds, depending on the requirements of the system. Modifications are saved to disk during an event called a "consistency point". In this approach, there is an inherent risk, albeit small risk, of losing data modified since the last consistency point if a failure occurs between consistency points. The risk increases as the amount of time between consistency point increases. Consequently, certain file servers such as the NetApp Filer products maintain, in a nonvolatile memory, a log of write requests received from clients since the last consistency point. This log is referred to as the "NVLog".

Maintaining the NVLog provides considerable protection against loss of data in the event of a system failure between consistency points. However, whenever data is transferred or stored within a processing system, there is a possibility the data can be corrupted, particularly if a failure has occurred. Therefore, to provide further protection against loss of data, it is desirable to have a way of verifying the integrity of data in the NVLog.

One known way of verifying NVLog data integrity is to include a checksum in the NVLog. FIG. 1 illustrates an NVLog in accordance with this technique. The NVLog 1 includes a log header 2 followed by a number (N) of entries 3, each entry representing a separate write request from a client. The log header 2 includes several information entities, including an Entry Count 4, a checksum 5, a CP (consistency point) count 6, and other metadata 7. The Entry Count 4 indicates the number of valid entries currently in the NVLog. The CP count identifies the last consistency point to be completed. Each request 3 includes an entry header 8 followed by a data field 9 containing the data associated with the request (if any), e.g., the data to be written to storage. The checksum 5 in the log header 2 is used to verify data integrity of the entire NVLog 1.

While this approach provides considerable added protection against loss of data, it is not an ideal solution. For example, the checksum 1 might be a function of all of the times at which the requests 3 were received by the file server (e.g., an XOR function). Yet if all of the requests 3 were received during the same smallest interval of time measured by the file server, the checksum will be weak. Moreover, with this approach there is an inherent trade-off between the strength of the checksum and system performance: the stronger the checksum is, the more computationally expensive it is, i.e., the slower execution tends to be. The above-described approach provides little flexibility regarding the use of system resources. What is needed, therefore, is an improved way of verifying NVLog data integrity, which can provide stronger data protection as well as greater flexibility.

SUMMARY OF THE INVENTION

The present invention includes a method and an apparatus, the method including maintaining a log of multiple requests in a storage server. Each of the requests corresponds to a storage operation to be performed by the storage server on a set of storage devices, the log including a separate log entry for each of the requests. A separate checksum is included in each of the log entries, where each checksum is for use by a checksum algorithm in determining data integrity of the corresponding log entry.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 5 illustrates an example of an NVLog in accordance with the present invention.

DETAILED DESCRIPTION

A method and apparatus for verifying file system log data using per-entry checksums are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, in certain embodiments of the invention, a file server implemented as a network storage appliance provides a separate checksum for each entry in the NVLog. Each checksum is for use by a checksum algorithm in the file server to verify data integrity of the corresponding log entry. The checksum algorithm is selected from among a number of selectable a checksum algorithms, based on one or more predetermined criteria, such as a desired balance between performance and checksum strength. Furthermore, the checksum algorithm may also be selected on a per-entry basis.

Figure 2:
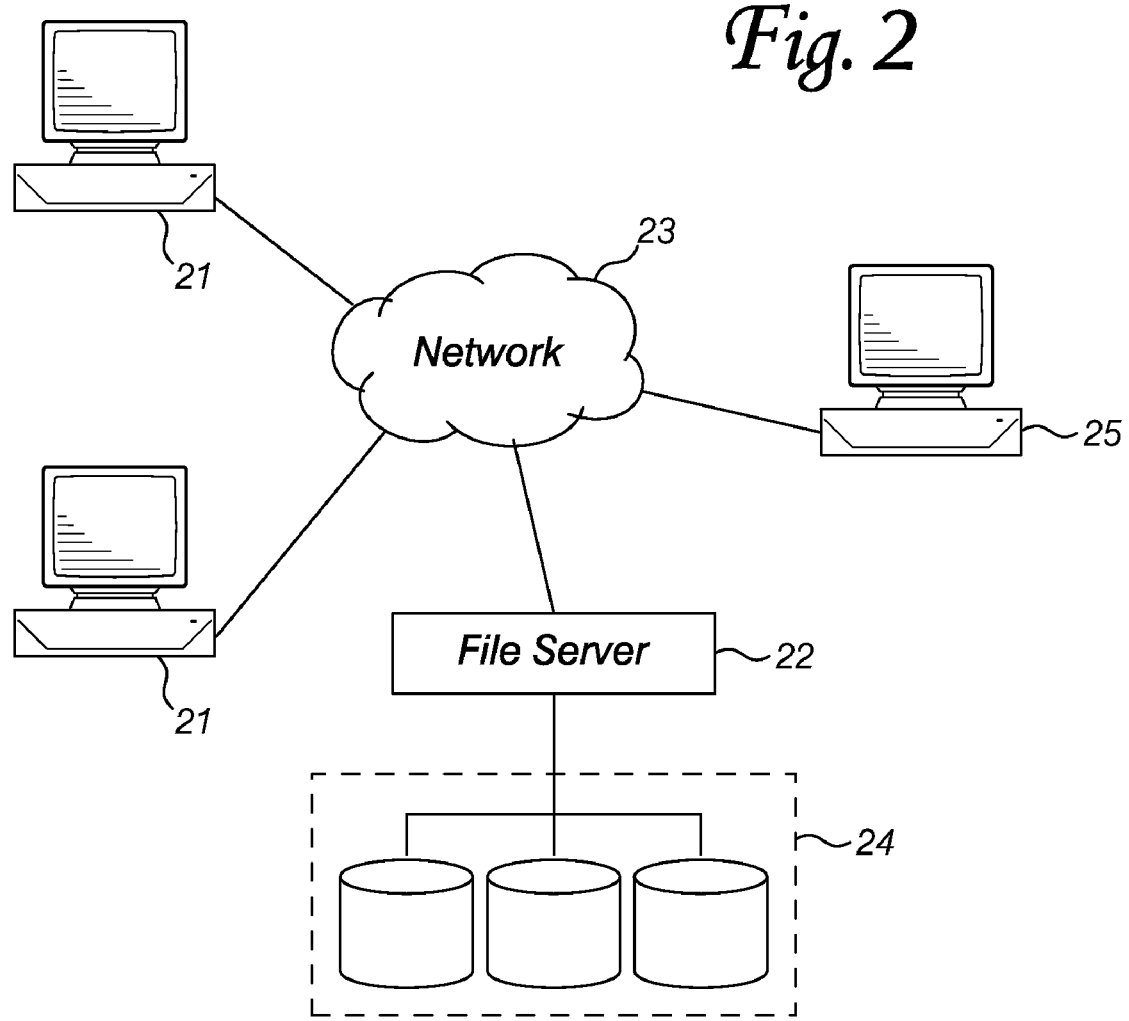
FIG. 2 illustrates a network environment which includes a file server that provides a number of clients with access to a set of storage devices.

Refer now to FIG. 2, which illustrates a network environment in which the invention can be implemented. A number of client processing systems ("clients") 21 are coupled to a file server 22 through a network 23. The file server 22 provides the clients 21 with access to files stored on a set of mass storage devices 24, such as disks, which may be configured as one or more RAID groups. Techniques of the present invention may be implemented within the file server 22, as described further below. Also coupled to the network 23 is a network management station 25, from which a network administrator may control various functions of the file server 22, including configuration settings and parameters, preferences, etc.

The file server may be a network appliance of the type mentioned above. The network may be a local area network (LAN), a wide area network (WAN), or a combination of these and/or other types of networks. Each of the clients 21 and the management station 25 may be, for example, a conventional personal computer (PC), workstation, or the like.

Figure 3:
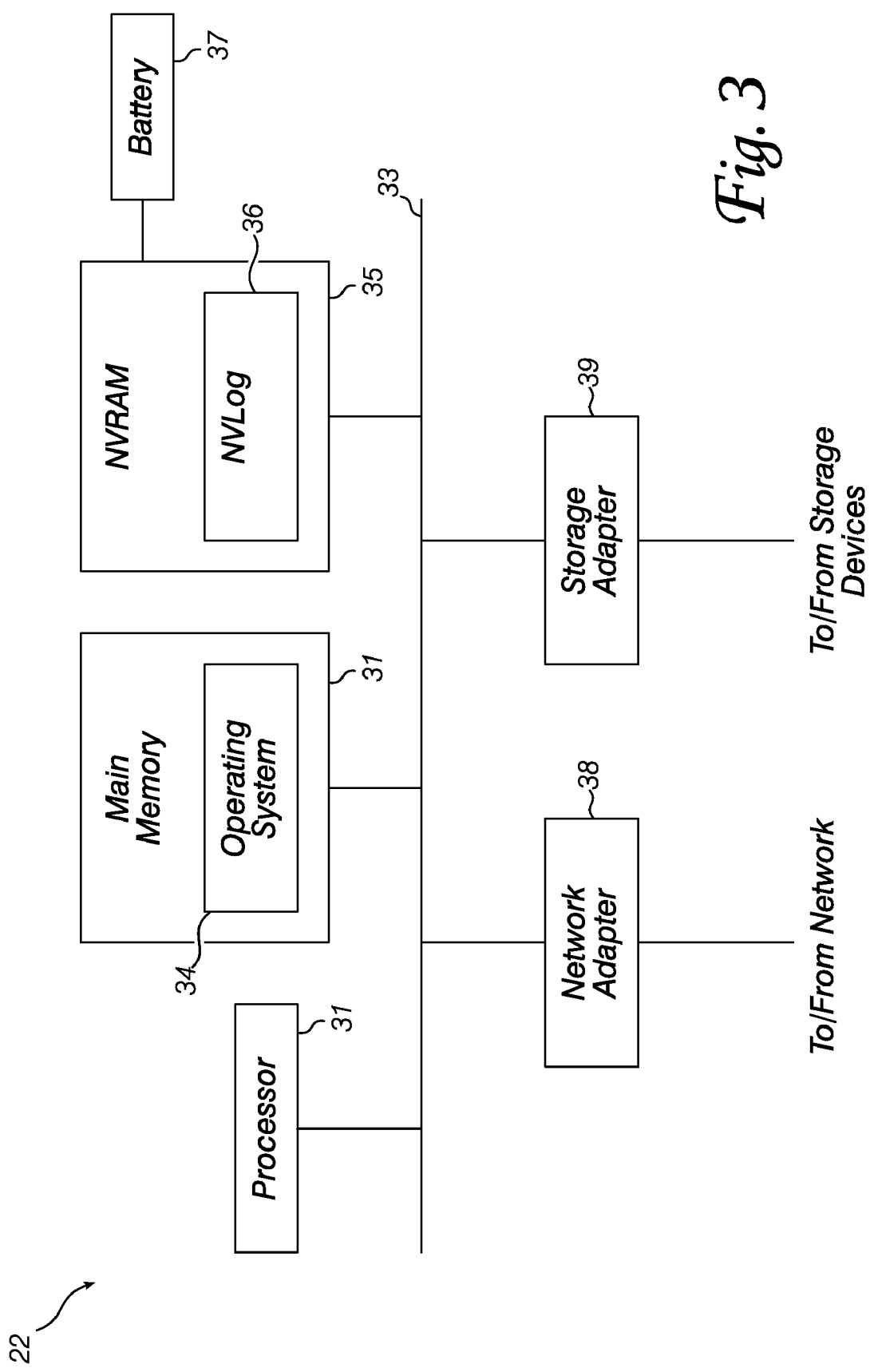
FIG. 3 is a conceptual block diagram of the architecture of the file server.

FIG. 3 is a conceptual block diagram of the architecture of the file server 22, according to certain embodiments of the invention. Note that certain standard and well-known components which are not germane to the present invention are not shown. The file server 22 as shown includes a processor 31 and main memory 32, coupled together by a bus system 33. The bus system 33 in FIG. 3 is an abstraction that represents any one or more separate physical buses and/or point-to-point connections, connected by appropriate bridges, adapters and/or controllers. The bus system 33, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 31 is the central processing unit (CPU) of the file server 22 and, thus, controls the overall operation of the file server 22. In certain embodiments, the processor 31 accomplishes this by executing software stored in main memory 32. The processor 31 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 32, which is generally some form of random access memory (RAM), stores the operating system 34 of the file server 22. Techniques of the present invention may be implemented within the operating system 34, as described further below. Also coupled to the processor 31 through the bus system 33 is another memory, i.e., a nonvolatile RAM (NVRAM) 35. The NVRAM 35 stores an NVLog 36, which is a log of all write requests received by the file server 22 from any of the clients 21 since the last consistency point. The NVRAM 35 may be formed by a conventional form of RAM coupled to an uninterruptible backup power source such as a battery 37.

Also connected to the processor 31 through the bus system 33 are a network adapter 38 and a storage adapter 39. The network adapter 38 provides the file server 22 with the ability to communicate with remote devices, such as clients 21, over the network 23 and may be, for example, an Ethernet adapter. The storage adapter 39 allows the file server 22 to access the external disks 24 and may be, for example, a Fibre Channel adapter or SCSI adapter.

Figure 4:
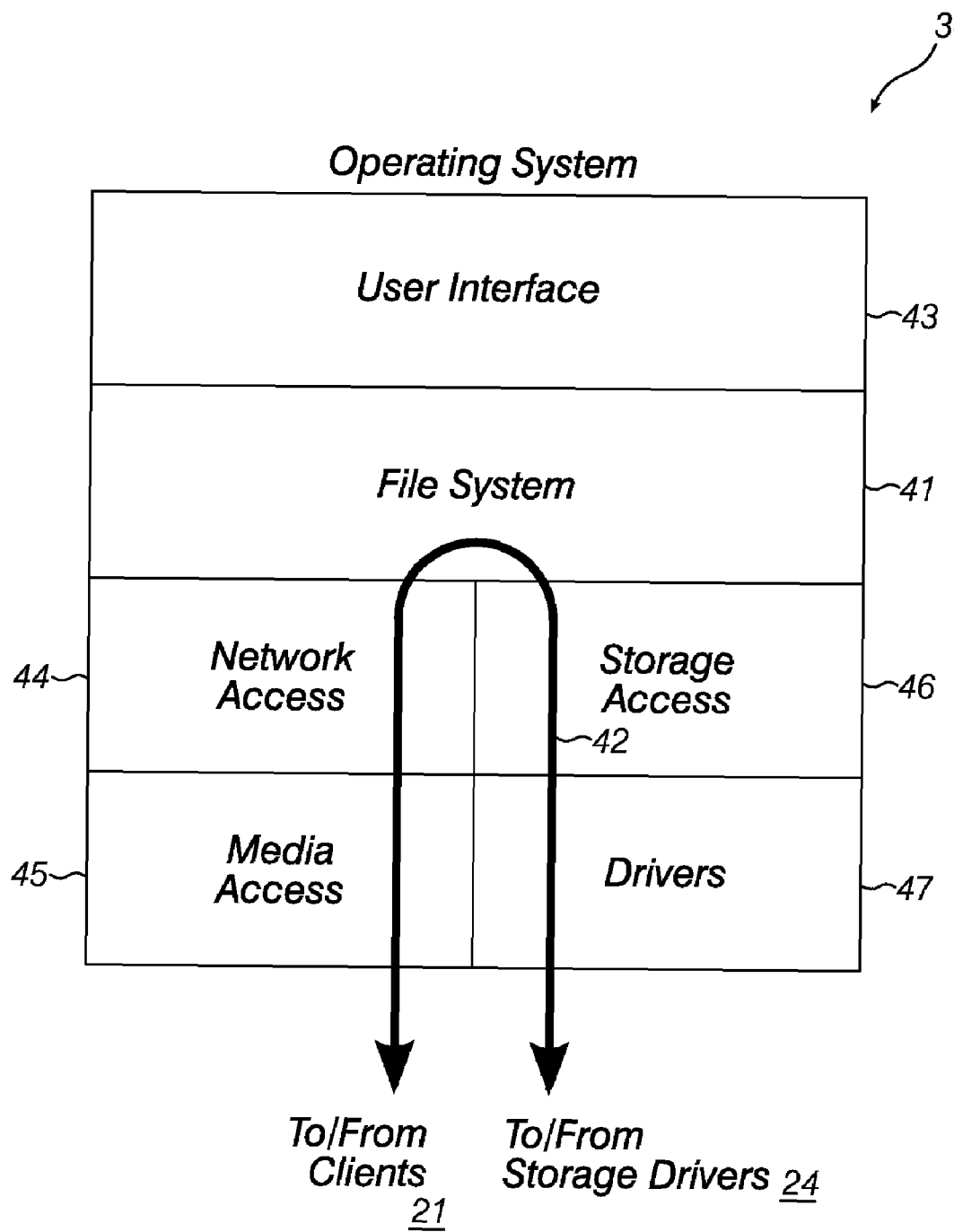
FIG. 4 is a block diagram of the operating system of the file server.

FIG. 4 illustrates the operating system 34 of the file server 22, according to certain embodiments of the invention. As can be seen, the operating system 34 includes a number of layers. The core of the operating system 34 is the file system 41 which, among other responsibilities, executes read and write operations on the storage devices 24 in response to client requests, maintains directories, and manages consistency point operations. Techniques of the present invention may also be implemented within the file system 41, as described further below. An example of a file system suitable for this purpose is the Write Anywhere File Layout to (WAFL) file system from Network Appliance, such as used in the NetApp Filers. Also shown in FIG. 4 is the logical data path 42 from clients 21 to storage devices 24, through the file system 41.

Above the file system 41, the operating system 34 also includes a user interface 43, through which a network administrator or other user can control and/or configure the file server 22 (e.g., remotely from the management station 25). The user interface 43 may provide a command line interface and/or a graphical user interface for this purpose.

Below the file system 41, on the client side the operating system 34 includes a network layer 44 and, at the lowest level, a media access layer 45. The network access layer 44 implements any of various protocols used to communicate with client devices, such as network file system (NFS), common Internet file system (CIFS) and/or hypertext transport protocol (HTTP). The media access layer 45 includes one or more drivers which implemented the protocols used to communicate over the network, such as Ethernet.

Below the file system 41 on the storage device side, the operating system 34 includes a storage access layer 46 and, at the lowest level, a driver layer 47. The storage access layer 46 implements a disk storage protocol such as RAID, while the driver layer 47 implements a lower-level storage device access protocol, such as Fibre Channel or SCSI.

As noted above, the file server 22 maintains an NVLog 36 within its NVRAM 35. In accordance with the present invention, the file server implements an improved technique for verifying data integrity of the NVLog 36. FIG. 5 schematically illustrates the NVLog 36, according to embodiments of the present invention.

The NVLog 36 includes a log header 52 followed by a number (N) of log entries 53, each entry representing a separate write request from a client 21. The log header 52 includes several entities, including an Entry Count 54, an Algorithm variable 55, CP (consistency point) count 56, and other metadata 57. The Entry Count 54 indicates the total number (N) of valid log entries 53 currently in the NVLog 36 at any given point in time. The CP count 56 identifies the last consistency point that was completed. Each log entry 53 includes an entry header 58 followed by a data field 59 containing the data (if any) associated with the request.

Figure 1:
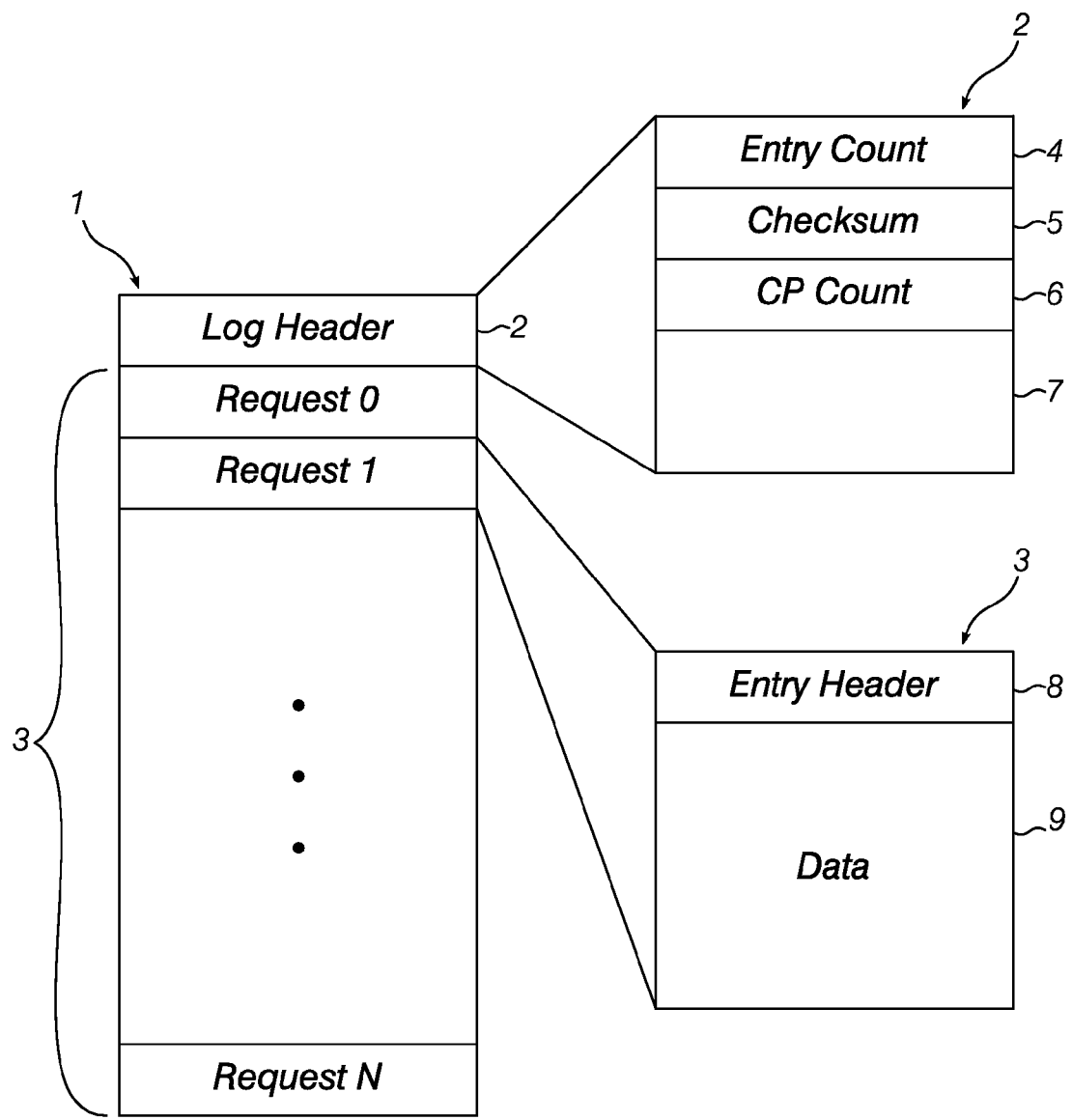
FIG. 1 illustrates an example of an NVLog used according to a known technique for verifying data integrity.

In contrast with the technique of FIG. 1, the log header 52 includes the Algorithm variable 55, but no checksum. Each entry 53 of the NVLog 36 includes its own separate checksum 61, which is located in the entry header 58. The entry header 58 may also include other information, such as a data size indication 62 indicating the amount of data contained in data field 59, filename 63 indicating the name of the file with which the data is associated, a timestamp 64 indicating when the request was received, and other metadata 65.

The Algorithm variable 55 in the log header 52 indicates to the file system 41 which checksum algorithm to use, of multiple selectable checksum algorithms 66, to verify data integrity of the log entries 53. Note that the Algorithm variable 55 does not necessarily have to be located in the log header 52. For example, in other embodiments, a separate Algorithm variable may be included in each log entry 53. Hence, if desired the checksum algorithm can also be selected and/or varied on an entry-by-entry basis. In that case, however, attention must be given to the risk that any corruption of a log entry might also corrupt the algorithm field of that entry. One way to mitigate this risk is to place two duplicate algorithm fields in each log entry; it can then be assumed that they are both valid as long as they are identical. Alternatively, the per-entry algorithm variable can be placed in a separate pre-header for each entry with its own checksum.

The Algorithm variable 55 can be set either manually (e.g., by a system administrator) or automatically, based on any of various criteria. The criteria may include, for example, security considerations, desired trade-off between performance and checksum strength, failure history of a particular device, etc. Furthermore, the Algorithm variable 55 can be set either statically (off-line) or dynamically (during normal operation of the file server 22), and it can be set either locally (at the file server 22) or remotely (e.g., from the management station 25).

Use of a separate checksum for each NVLog entry is advantageous, because it allows verification of data integrity of each NVLog entry as soon as the entry is generated, because the checksum is written to NVRAM along with the data in the entry. Consequently, data corruption can be detected "on-the-fly", i.e., during normal operation of the file server 22 as client requests are being received and serviced. Furthermore, because completely independent metadata can be used for different log entries, the checksum can be made as strong or as weak as desired, to achieve the desired trade-off between system performance and checksum strength. Thus, the checksum algorithm can be tuned based on policy, and it can be modified at essentially any time. For example, during manufacture and testing of the file server 11, it may be desirable to select a more robust checksum algorithm at the expense of system performance, in order to detect any potential problems with the system; whereas, in a production unit sold to a customer, it may be desirable to use a different checksum algorithm which optimizes performance while still providing a desired level of data protection.

In certain embodiments, the file server 22 also provides a way to verify the integrity of the Entry Count 54, as will now be described. Each log entry 53 is assigned a unique serial number, such that the serial numbers of consecutive log entries are monotonically increasing. Usually, the last entry in the NVLog which contains valid data is the entry with the serial number given as {Start Count+Entry Count−1}, where Start Count is the serial number of the first log entry in the NVLog 36 ("Request 0" in FIG. 5). However, it may be assumed that when a new entry is added to the NVLog, there is a finite period of time between the time the new entry is added and the time at which the Entry Count is updated to reflect the new entry. During this brief interval, the entry with the serial number given as {Start Count+Entry Count} would actually contain valid data, whereas at other times it should not.

Therefore, to verify data integrity of the Entry Count 54, the file server 22 examines the checksum 61 for the entry with the serial number given as {Start Count+Entry Count} and the checksum 61 for the entry with the serial number given as {Start Count+Entry Count+1}. That is, the file server 22 examines the checksum 61 of the two log entries immediately after what should be the last valid NVLog entry in the NVLog 36 according to the Entry Count 54. If the result of this operation indicates that both of those NVLog entries have valid data, then the Entry Count 54 must be corrupted, since both of these entries should not contain valid data (and in fact, neither of them should contain valid data most of the time). For example, if Start Count is 0 and Entry Count is N, then the last valid entry should be the entry with serial number N−1. Hence, the file server 22 examines the checksum 61 of the entry with serial number N and the checksum 61 of the entry with serial number N+1 to determine whether it has valid data. If the result indicates that entries N and N+1 both have valid data, then the file server 22 decides that Entry Count 54 must be corrupt.

As yet another extension of this technique, an additional checksum may be included in the log header 52, as done in the technique of FIG. 1, but in this case, it would be used to verify the integrity of only the contents of the log header (as opposed to the log entries).

The techniques for verifying data integrity introduced above can also be applied in various contexts and environments other than those described. For example, these techniques can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

Thus, a method and apparatus for verifying file system log data using per-entry checksums have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

maintaining a log in a storage server, said log containing a plurality of log entries, and each log entry corresponding to a request for the storage server to perform a write operation on a set of storage devices;

including a separate checksum in each of the log entries, each checksum for use by a checksum algorithm in determining data integrity of the corresponding log entry;

including an algorithm variable in the log to select the checksum algorithm from a plurality of selectable checksum algorithms; and automatically selecting the checksum algorithm based on a predetermined criterion, wherein said automatically selecting the checksum algorithm comprises selecting the checksum algorithm dynamically by modifying the algorithm variable during operation of the storage server.

2. A method as recited in claim 1, wherein the requests originate from a set of client devices serviced by the storage server.

3. A method as recited in claim 1, further comprising selecting the checksum algorithm based on a desired balance between performance and checksum strength.

4. A method as recited in claim 1, further comprising including a separate algorithm variable in each of the log entries, to specify a checksum algorithm to be used separately for each said log entry.

5. A method as recited in claim 1, further comprising:
maintaining an entry count in the log to indicate the number of log entries in the log; and
using the checksum of one of the log entries to determine whether the entry count is corrupted.

6. A storage server comprising:
means for receiving a plurality of requests from a set of client devices, each request corresponding to a storage operation to be performed by the storage server in relation to a set of storage devices;
means for maintaining a log of the requests in the storage server, the log including a separate log entry for each of the write operation requests, the log further including a separate checksum in each of the log entries, each checksum for use by a checksum algorithm in determining data integrity of the corresponding log entry;
an algorithm variable in the log to select the checksum algorithm from a plurality of selectable checksum algorithms; and
means for automatically selecting the checksum algorithm based on a predetermined criterion, wherein said means automatically selecting the checksum algorithm comprises selecting the checksum algorithm dynamically by modifying the algorithm variable during operation of the storage server.

7. A storage server as recited in claim 6, further comprising means for selecting the checksum algorithm based on a desired balance between performance and checksum strength.

8. A storage server as recited in claim 6, further comprising means for automatically selecting the checksum algorithm based on a predetermined criterion.

9. A storage server as recited in claim 8, further comprising means for including an algorithm variable in the log to select the checksum algorithm from a plurality of selectable checksum algorithms, wherein said means for automatically selecting the checksum algorithm comprises means for selecting the checksum algorithm dynamically by modifying the algorithm variable during operation of the storage server.

10. A storage server as recited in claim 6, further comprising means for including a separate algorithm variable in each of the log entries, to specify a checksum algorithm to be used separately for each said log entry.

11. A storage server as recited in claim 6, further comprising:
means for maintaining an entry count in the log to indicate the number of log entries in the log; and
means for using the checksum of one of the log entries to determine whether the entry count is corrupted.

12. A storage server as recited in claim 6, wherein the storage appliance is a network appliance.

13. A method for operating a network-accessible data storage server, comprising:
receiving a plurality of storage requests from at least one client;
preparing a plurality of log entries, each log entry of the plurality of log entries corresponding to one storage request of the plurality of storage requests, and each log entry including a checksum of the log entry;
storing a monotonically increasing serial number in each of the plurality of log entries;
storing the plurality of log entries in a non-volatile random access memory ("NVRAM");
preparing a log header containing a count of the plurality of log entries;
storing the log header in the NVRAM;
identifying a minimum serial number of the plurality of log entries as a start serial number;
verifying a log entry with a serial number equal to a sum of the start serial number and the count of the plurality of log entries; and
verifying a log entry with a serial number equal to a sum of the start serial number and the count of the plurality of log entries and one.

14. The method of claim 13 further comprising:
computing a checksum of the log header and storing the checksum with the log header in the NVRAM.

15. A method comprising:
maintaining a log of a plurality of requests in a storage server, each of the requests corresponding to a write operation to be performed by the storage server on a set of storage devices, the log including a separate log entry for each of the requests;
including a separate checksum in each of the log entries, each checksum for use by a checksum algorithm in determining data integrity of the corresponding log entry;
including an algorithm variable in the log to select the checksum algorithm from a plurality of selectable checksum algorithms; and
automatically selecting the checksum algorithm based on a predetermined criterion, wherein said automatically selecting the checksum algorithm comprises selecting the checksum algorithm dynamically by modifying the algorithm variable during operation of the storage server.

* * * * *